H. M. QUACKENBUSH.
Metal-Turning Lathe.

No. 165,425.  Patented July 13, 1875.

Witnesses.  H. M. Quackenbush.

UNITED STATES PATENT OFFICE.

HENRY M. QUACKENBUSH, OF HERKIMER, NEW YORK.

IMPROVEMENT IN METAL-TURNING LATHES.

Specification forming part of Letters Patent No. 165,425, dated July 13, 1875; application filed May 20, 1875.

*To all whom it may concern:*

Be it known that I, HENRY M. QUACKENBUSH, of Herkimer, Herkimer county, New York, have invented a certain Method of Fitting Arbors to Lathes, &c., of which the following is a specification:

This invention has reference to the construction of the head-stock of turning-lathes or other analogous machines, or the method of mounting the arbor therein, the purpose of the invention being to obtain such a construction of parts as will enable a tight and close bearing to be insured at all times with little labor and trouble, and to provide a lathe at very small cost, which the extreme simplicity of my plan enables me to do.

Figure 1:
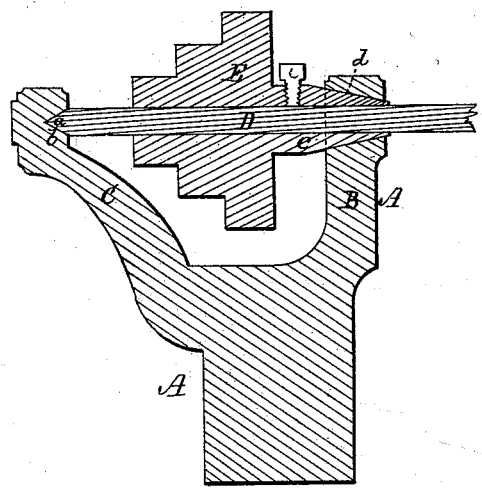
Figure 2:
Figure 3:
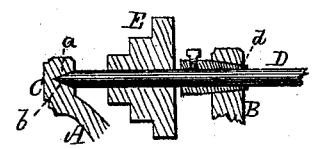

The drawings accompanying this specification represent, in Figure 1, a central and longitudinal section of the head-stock of a lathe containing my improvements. Fig. 2 is a transverse section of the arbor and sleeve, and Fig. 3 is a section of a modified form of construction.

In the drawings, A represents the main frame of the head-stock of a lathe, the same being, in form and size, as now generally in use, according to the character of the lathe to which it belongs, the front standard of the said head-stock being shown at B, and the rear one at C.

Heretofore, in the construction of head-stocks of lathes, the two bearings of the arbor have been formed upon or made part of such arbor, and inclosed in boxes, which require more or less fitting. In this invention the front or main bearing is part and parcel of the pulley by which the arbor is driven, and, together with the pulley, is susceptible of ready adjustment upon such arbor, the said bearing being frusto-conical or tapering, and received within a corresponding socket or box, by which a close joint is preserved.

In carrying my invention into practice, in one simple form in which its principle may be embodied, I provide myself with an arbor, D, which is simply a round piece of steel or iron, of the requisite diameter and length, and I reduce one end of this arbor to a pointed pivot, $a$, and step such pivot in a pocket, $b$, which may be simply countersunk in the standard C; or, if greater nicety is required, may be of Babbitt metal, let into such standard. I next provide a pulley, E, which may be of any form or character desired, and cast upon or affix to this pulley a hub, $c$, which I confine to the arbor by a set-screw, $e$, or by other means, and I then bore out the same to receive tightly the arbor D, and subsequently turn down the periphery of the pulley concentrically with such arbor, at the same time turning down the hub $c$ to a conic frustum, $d$. I then bore out the standard B with a tapering seat to receive the bearing $d$, and the head-stock is complete.

Among the advantages attaching to my invention are the following: First, by simply loosening the screw $e$ the pulley E and arbor D may be removed; and as this arbor may be composed of the shank of a drill or the stem of a chuck, or may constitute part of some other tool, I am enabled to readily and instantly withdraw one tool and substitute another so long as the diameter of the shank or arbor does not vary materially. Second, an important result reached by my invention is the extreme simplicity and cheapness of construction, as I avoid the nice fitting usually required about the step at the rear end of the arbor. Third, owing to the length of the pulley E and hub $c$, they stiffen and strengthen the arbor D, and I am enabled to use a smaller and less expensive piece of steel whereof to make such arbor, thereby effecting one point of economy. Fourth, the only perceptible wear upon the arbor is at its rear pivot, which is very slight, and practically nothing. Owing to the tapering form of the bearing or plug $d$ a tight joint is always preserved, and the wear is very slow.

I do not confine myself to the precise construction of parts as herein shown, as these may be varied somewhat without losing sight of the gist of my invention, which I consider to consist in transferring the main bearing from the arbor to an independent sleeve or hub secured to or making part of the pulley, and capable of endwise adjustment upon said arbor, or secured to the arbor independent of the pulley, as shown in Fig. 3 of the drawings.

I claim—

The construction of parts, substantially as herein shown—that is, constructing the main bearing of a hub or sleeve, $c$, mounted adjustably upon the arbor D, or secured to or making part of the pulley E, and both susceptible of endwise adjustment upon the arbor D, whereby the tapering plug $d$ of the hub is fitted to its seat, and advantages are obtained essentially as stated.

H. M. QUACKENBUSH.

Witnesses:
S. W. LINTS,
M. W. RASBACH.